June 26, 1956    M. MENNESSON    2,751,778
MEASUREMENT APPARATUS FOR CHECKING
UP THE INSIDE OF HOLLOW PIECES
Original Filed May 15, 1948
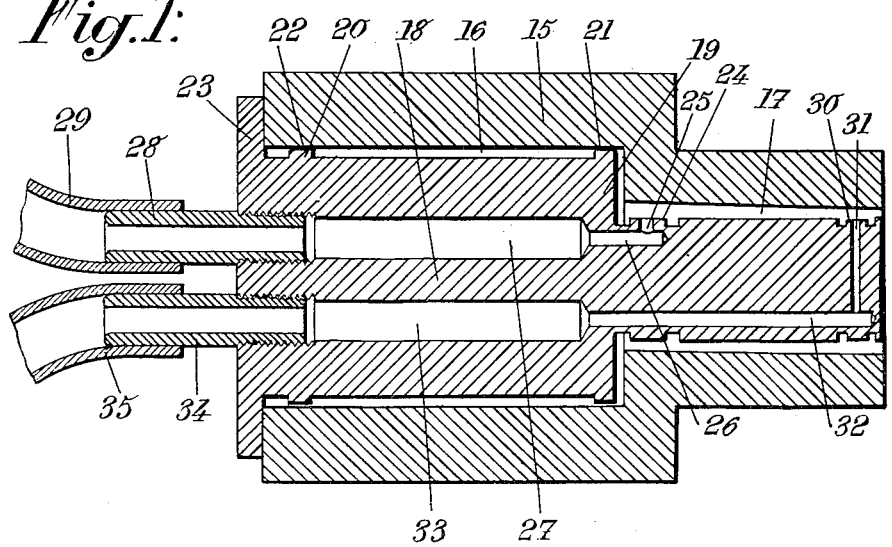
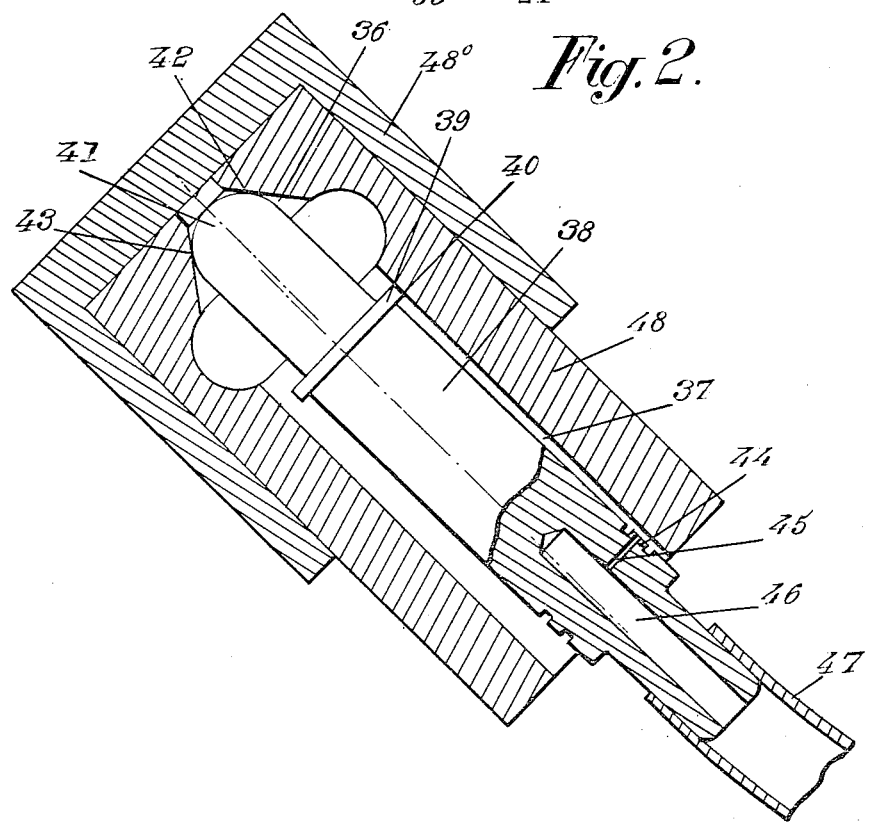
INVENTOR
MARCEL MENNESSON
BY
Bailey, Stephens & Huettig
ATTORNEYS United States Patent Office 2,751,778
Patented June 26, 1956

2,751,778

MEASUREMENT APPARATUS FOR CHECKING UP THE INSIDE OF HOLLOW PIECES

Marcel Mennesson, Neuilly-sur-Seine, France, assignor to Societe Anonyme pour la Construction de Materiel Automobile (S. A. C. M. A.), Neuilly-sur-Seine, France, a society of France Original application May 15, 1948, Serial No. 27,165. Divided and this application August 5, 1952, Serial No. 302,689

Claims priority, application France July 21, 1947

4 Claims. (Cl. 73—37.9)

The present invention which is a division of my U. S. patent application Ser. No. 27,165, filed May 15, 1948, for "Measurement Apparatus for Checking up Calibrated Pieces," now abandoned, relates to measurement apparatus for checking the inside of hollow pieces having a cavity the wall of which includes two surfaces of revolution distinct from and coaxial with each other.

The chief object of my invention is to provide a checking apparatus capable of detecting defects in the shape concentricity of these two surfaces.

Preferred embodiments of my invention will be hereinafter described with reference to the accompanying drawings, given merely by way of example, and in which:

Fig. 1 is a longitudinal axial section of a checking apparatus made according to a first embodiment of the invention;

Fig. 2 is a similar view of another embodiment of my invention.

The example of Fig. 1 relates to the checking of a piece 15 including two cylindrical bores 16 and 17. It is desired to ascertain whether these bores are truly concentric. My apparatus comprises a plug including a body 18 and two flanges 19 and 20 the points of contact of which with the piece to be checked are at 21 and 22.

A shoulder 23 permits of positioning plug 18 and piece 15 relatively to each other.

If it is merely desired to check the concentricity of the two bores 16 and 17 shown on the drawing, I provide a nozzle 24 fed with compressed air through a calibrated orifice 25, itself fed through orifices 26, 27 connected with the micro-measurement apparatus through a coupling 28 and a conduit 29. Passages (not shown) permit evacuation of the air escaping from the nozzle. In order to measure concentricity of these two bores, I proceed as follows. Piece 15 resting freely on points 21 and 22, the axis of nozzle 24 being vertical and its orifice being turned upwardly, it is clear that if piece 15 is rotated while plug 18 remains stationary, the variations that are found to occur as a consequence of the fact that the wall of bore 17 moves toward or away from nozzle 24 permit of determining the degree of concentricity of bores 16 and 17.

If now it is desired further to check the alinement of the axes of bores 16 and 17, it suffices to provide a second nozzle 30 disposed similarly to nozzle 24 and located at a distance therefrom, this nozzle 30 being fed through conduits 31, 32, 33 connected with the micro-measurement apparatus through a coupling 34 and a conduit 35.

Proceeding as above to make the measurement, it is clear that it will be possible to determine the relative inclination of the axis of bore 17 with respect to the axis of bore 16. Parallelism exists between the two bores when the difference of the dimensions measured by means of nozzles 24 and 30 is constant. This system of nozzles 24 and 30 also gives indications concerning the conicity of bore 17.

I will now consider the case where checking relates to the concentricity of a cone 36 and of a bore 37 (Fig. 2).

The plug then includes a body 38 and a flange 39 which contacts at 40 the wall of bore 37. The end of said plug is constituted by a section of a sphere 41 which bears against the cone at 42—43. A nozzle 44 is fed with compressed air through a calibrated orifice 45 and a conduit 46 connected through a pipe 47 with the micro-measurement apparatus.

The operation is as follows:

If the piece 48 to be measured is light, the axis of plug 38 on which said piece is mounted is held in an inclined position as shown by Fig. 2 so that piece 48 automatically rests on said plug, ensuring good contacts at 40 and along the line of contact of the portion of a sphere 41 and cone 36, the plug being positioned in such manner that the axis of nozzle 44 is in the vertical plane which contains the axis of bore 37. It then suffices to operate as above, i. e. to rotate piece 48 about said axis. The variations of dimension indicated by the rate of flow through nozzle 44 give the desired indications concerning the concentricity of cone 36 and bore 37, insofar, of course, as the rectilinearity of this bore 37 will have first been ascertained.

If I call, $a$ the distance from the axis of the cone to the axis of the bore, $b$ the distance, in a direction parallel to the axis, between contact pieces 40 and 42, $c$ the distance from flange 39 to the axis of nozzle 44, the amplification of a defect of concentricity $a$ will be equal to $$\frac{2c}{b}$$

If the piece 48 to be measured is too light, it is fitted with a weight 48°.

In a general manner, if the piece to be checked is too heavy or too cumbersome, this piece is kept stationary and the plug, fitted with suitable push-pieces, is rotated with respect to said piece.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. An apparatus for checking a piece provided with a cavity the wall of which includes two cylindrical surfaces of revolution of different respective diameters and coaxial with each other, said apparatus comprising a plug made of two coaxial cylindrical portions integral with each other and placed end to end, these two portions being of different diameters substantially smaller than those of said two surfaces respectively, two concentric flanges carried by one of said two cylindrical plug portions, located at a distance from each other, the other plug portion having means including at least one air nozzle for measuring the radial distance of a point of said last mentioned plug portion from the inner wall of said cavity.

2. An apparatus for checking a piece provided with a cavity the wall of which includes two cylindrical surfaces of revolution of different respective diameters and coaxial with each other, said apparatus comprising a plug made of two coaxial cylindrical portions integral with each other and placed end to end, these two portions being of different diameters substantially smaller than those of said two surfaces respectively, two concentric flanges carried by one of said two cylindrical plug portions, located at a distance from each other, the other plug portion having two distinct means at two points thereof located at a distance from each other along the same generatrix thereof for measuring the radial distances of said points from the inner wall of said cavity, said distance measuring means including air nozzles.

3. An apparatus for checking a piece provided with a cavity the wall of which includes a cylindrical and a conical surface both of revolution about the same axis, the larger diameter of the conical surface being toward the cylindrical surface, said apparatus comprising a plug made of two portions, one cylindrical and of a diameter substantially smaller than that of said cylindrical surface, and the other spherical, having its center on the axis of said cylindrical portion and of a diameter intermediate between the larger and smaller diameters of said conical surface, a concentric flange carried by the cylindrical plug portion, of a diameter slightly smaller than the diameter of said cylindrical surface, the cylindrical plug portion having means including at least one air nozzle for measuring the radial distance of a point of said last mentioned plug portion from the inner wall of said cavity.

4. An apparatus for checking a piece provided with a cavity the wall of which includes two surfaces of revolution distinct from and coaxial with each other, said apparatus comprising a support made of two portions rigid with each other and adapted to engage with a substantial play in said two surfaces respectively, one of said two support portions being adapted to contact the inner wall of said cavity tangentially along a very small length of one generatrix of one of said two surfaces, a projection carried by said support adapted to contact the inner wall of said cavity only along a very small length of one generatrix of one of said surfaces located in the same radial plane of said cavity as the first mentioned generatrix and to hold the remainder of the area of said support out of contact with the wall of said cavity, said support being so positioned that said radial plane is vertical when said piece is resting freely on said support, said support having means located in said vertical plane outside of the interval between the areas of contact of said support with said cavity wall for measuring the radial distance from a point of said support located in said vertical plane to the point of the inner wall of said cavity located in the same plane opposite said first mentioned plane, said distance measuring means including at least one air nozzle.

References Cited in the file of this patent

UNITED STATES PATENTS

| | | |
|---|---|---|
| 2,346,406 | Wright | Apr. 11, 1944 |
| 2,374,154 | Moore | Apr. 17, 1945 |
| 2,446,071 | Aller | July 27, 1948 |
| 2,572,368 | Minix | Oct. 24, 1948 |